United States Patent [19]
Pejathaya

[11] Patent Number: 5,769,493
[45] Date of Patent: *Jun. 23, 1998

[54] LINEAR RECLINER WITH EASY ENTRY MEMORY FEATURE

[75] Inventor: Srinivas Pejathaya, St. Clair Shores, Mich.

[73] Assignee: Fisher Dynamics Corporation, St. Clair Shores, Mich.

[ * ] Notice: The term of this patent shall not extend beyond the expiration date of Pat. No. 5,660,440.

[21] Appl. No.: 789,838

[22] Filed: Jan. 29, 1997

Related U.S. Application Data

[63] Continuation-in-part of Ser. No. 607,949, Feb. 28, 1996, Pat. No. 5,660,440.

[51] Int. Cl.⁶ ........................................................ B60N 2/02
[52] U.S. Cl. .................................. 297/362.12; 297/361.1; 297/375
[58] Field of Search ........................... 297/362.12, 361.1, 297/375, 378.12, 368, 369

[56] References Cited

U.S. PATENT DOCUMENTS

| | | |
|---|---|---|
| 3,328,076 | 6/1967 | Naef . |
| 3,635,525 | 1/1972 | Magyar . |
| 3,736,025 | 5/1973 | Ziegler et al. ........................... 297/369 |
| 3,957,312 | 5/1976 | Bonnaud . |
| 4,065,178 | 12/1977 | Carella et al. . |
| 4,394,047 | 7/1983 | Brunelle ............................. 297/362.12 |
| 4,502,730 | 3/1985 | Kazaoka et al. . |
| 4,579,386 | 4/1986 | Rupp et al. ......................... 297/362.12 |
| 4,660,886 | 4/1987 | Terada et al. . |
| 4,799,733 | 1/1989 | Beley et al. . |
| 4,822,101 | 4/1989 | Hosoe . |
| 4,865,386 | 9/1989 | Detloff et al. ........................... 297/375 |
| 4,881,775 | 11/1989 | Rees ..................................... 297/361.1 |
| 4,898,424 | 2/1990 | Bell .................................... 297/395 X |
| 4,925,228 | 5/1990 | Pipon et al. . |
| 5,052,752 | 10/1991 | Robinson ................................ 297/375 |
| 5,269,588 | 12/1993 | Kunz et al. . |
| 5,280,999 | 1/1994 | Jones et al. .......................... 297/361.1 |
| 5,299,853 | 4/1994 | Griswold et al. ................. 297/361.1 X |
| 5,320,413 | 6/1994 | Griswold et al. .................. 297/362.12 |
| 5,344,215 | 9/1994 | Dahlbacka .............................. 297/375 |
| 5,360,256 | 11/1994 | Miller et al. ......................... 297/361.1 |
| 5,390,981 | 2/1995 | Griswold .......................... 297/378.12 |
| 5,393,123 | 2/1995 | Hernandez et al. ............... 297/378.12 |
| 5,568,843 | 10/1996 | Porter et al. ........................... 297/375 |
| 5,618,083 | 4/1997 | Martone et al. ............... 297/362.12 X |
| 5,660,440 | 8/1997 | Pejathaya .......................... 297/362.12 |

Primary Examiner—Peter M. Cuomo
Assistant Examiner—Rodney B. White
Attorney, Agent, or Firm—Harness, Dickey & Pierce, P.L.C.

[57] ABSTRACT

A linear recliner assembly is disclosed that is operable for permitting selective reclining movement of a seatback relative to a seat bottom between an upright position and a fully-reclined position. The linear recliner assembly is further operable to permit the seatback to be pivoted from any reclined position to a forward dumped position. Upon return of the seatback from its forward dumped position, the linear recliner assembly is adapted to relatch the seatback in its previous reclined position.

22 Claims, 8 Drawing Sheets

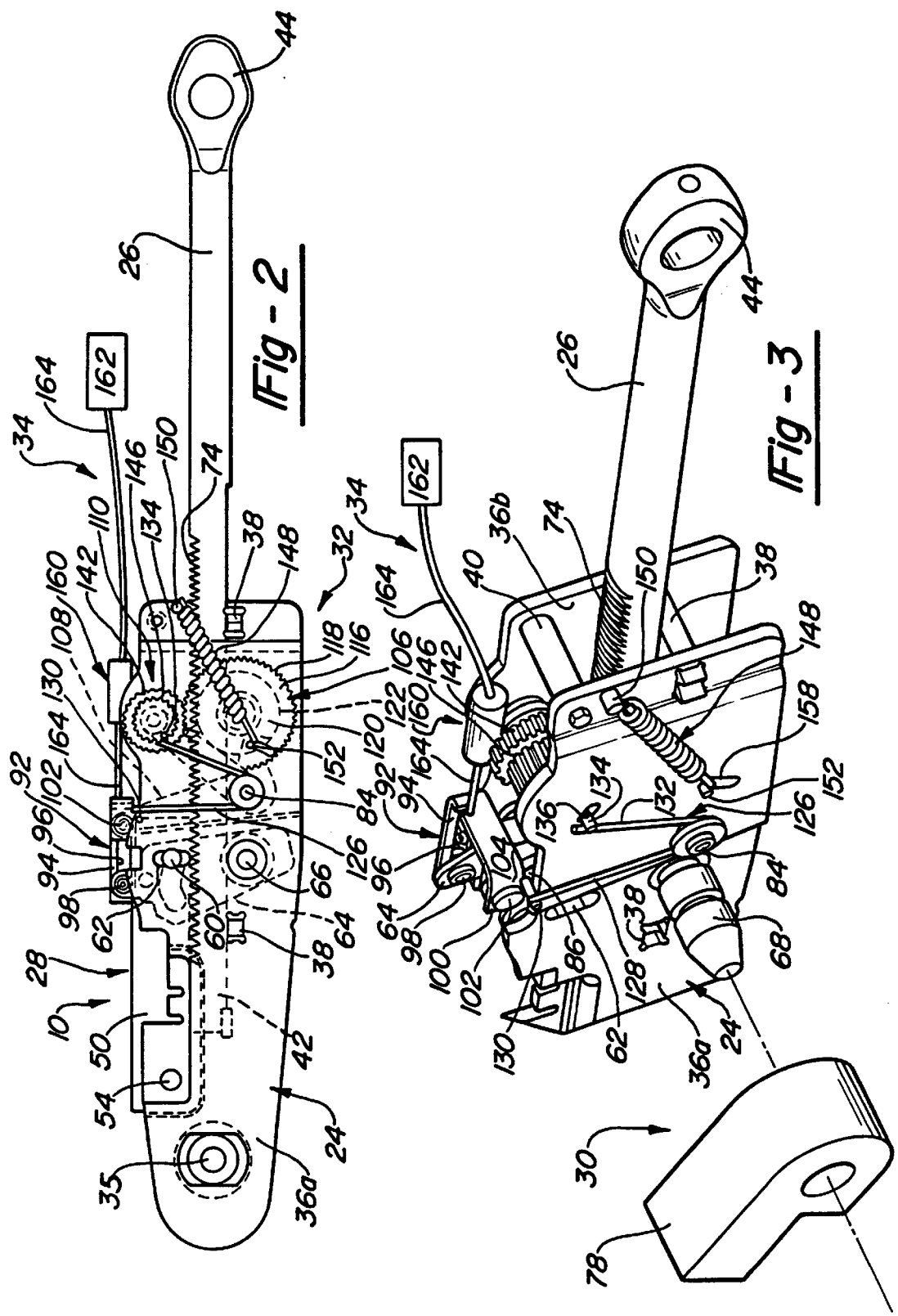

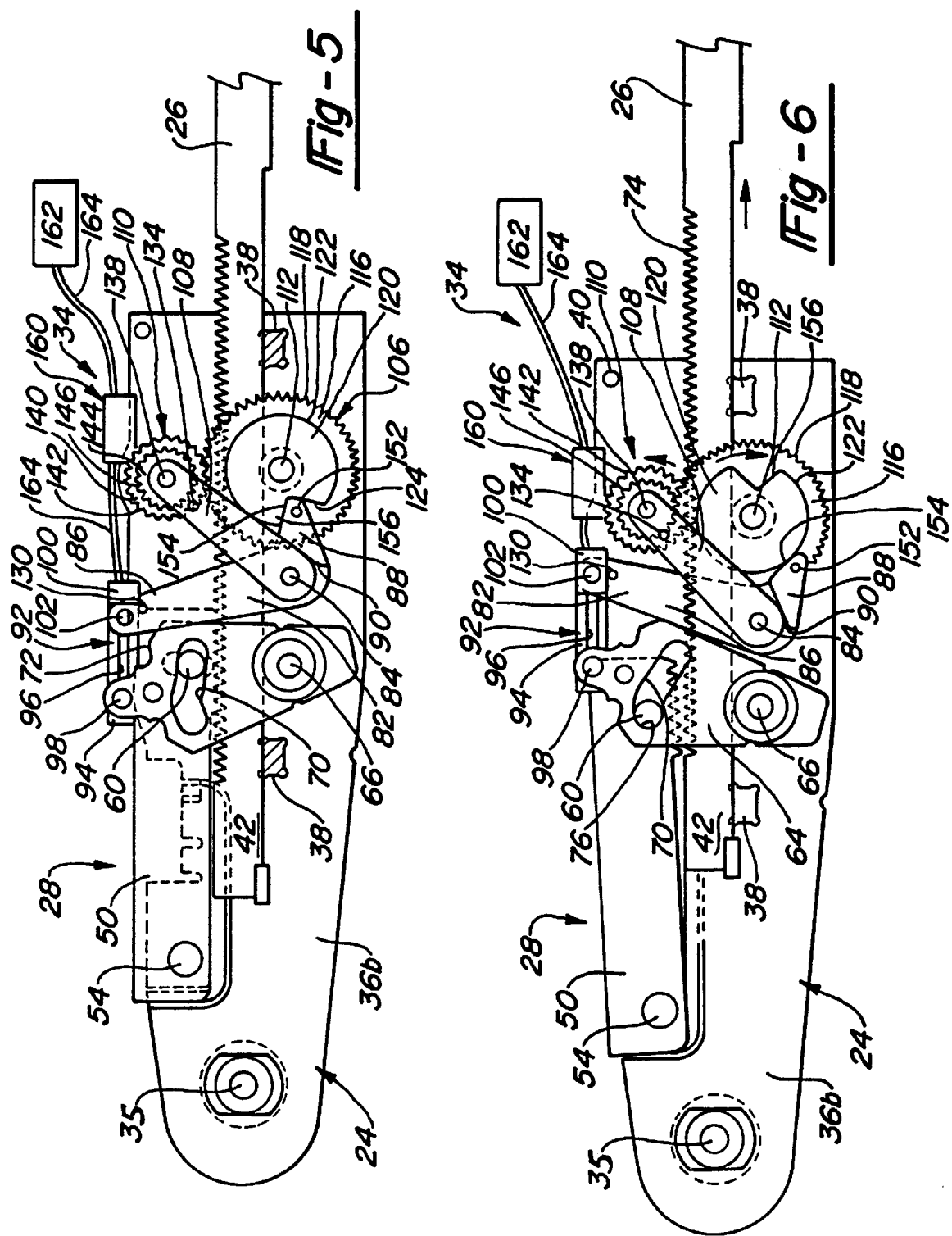

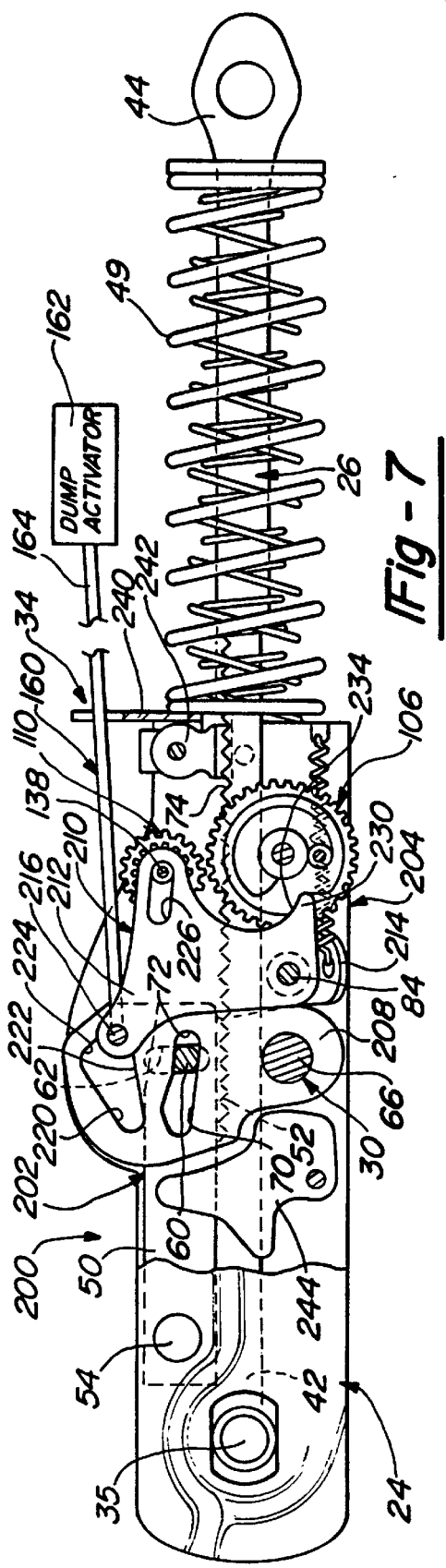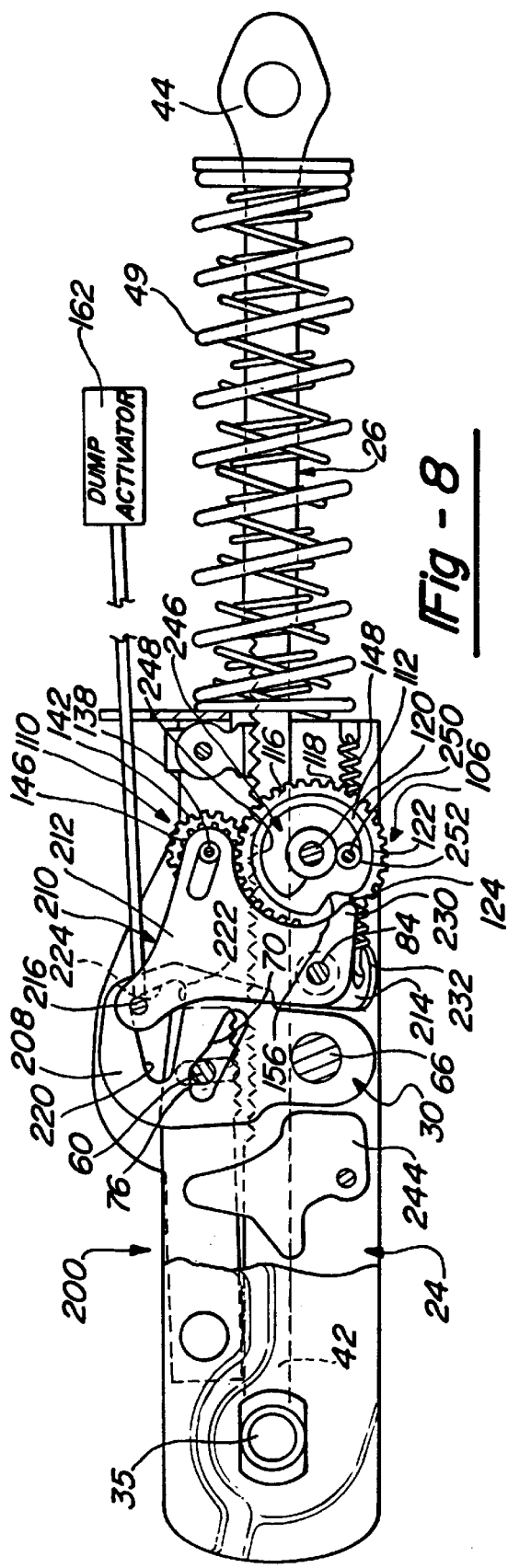

LINEAR RECLINER WITH EASY ENTRY MEMORY FEATURE

CROSS REFERENCE TO RELATED APPLICATIONS

This application is a continuation-in-part of U.S. application Ser. No. 08/607,949 filed Feb. 28, 1996.

BACKGROUND OF THE INVENTION

1. Field of the Invention

The present invention relates generally to seats for motor vehicles and, more specifically, to a linear recliner assembly having an easy entry memory feature for use with vehicle seats.

2. Description of Background Art

Virtually all motor vehicles are now equipped with front seats having a recliner mechanism that can be selectively actuated for permitting the angular position of the seatback to be varied between an upright position and a fully reclined position relative to the seat bottom. In most two door vehicles, the front seats also include a seatback dump mechanism that can be selectively actuated for forwardly folding (i.e., "dumping") the seatback to permit greater access to the rear seating area of the vehicle passenger compartment.

Conventional linear recliner mechanisms are designed to be disengaged when the seatback is folded forwardly in order to obtain access to the rear seat of the vehicle passenger compartment. As such, the angular position of the seatback must be reset to the desired angular position when the seatback is returned to its upright position for occupant seating.

It is therefore desirable to provide an improved linear recliner and dump mechanism with an easy entry memory feature which insures that the seatback is returned to the previous selected angular position after the seatback has been "dumped" forward for access to the rear seat of the vehicle passenger compartment.

SUMMARY OF THE INVENTION

Accordingly, it is the object of the present invention to provide a linear recliner assembly for a vehicle seat that is operable to permit selectively reclining and dumping movement of the seatback and which has a memory feature for returning the seatback to its previous reclined position after a dumping operation has been performed.

A further object of the present invention is to provide a linear recliner assembly for a vehicle seat which is operable to permit the angular reclined position of the seatback to be adjusted independently of the memory feature.

It is a further object to provide the linear recliner assembly of the present invention with a latching mechanism that is operable in a latched mode for inhibiting reclining movement of the seatback and in an unlatched mode for permitting reclining movement of the seatback.

Still another object of the present invention is to provide a linear recliner assembly having the above-noted features and yet which is simple in structure, inexpensive to manufacture, easy to mass produce and durable in use.

These and other objects are obtained by providing a linear recliner assembly that is operable for permitting selective reclining movement of a seatback relative to a seat bottom between an upright position and a fully-reclined position. The linear recliner assembly is further operable to permit the seatback to be pivoted from any reclined position to a forward dumped position. Upon return of the seatback from its forward dumped position, the linear recliner assembly is adapted to relatch the seatback in its previous reclined position. More specifically, the linear recliner assembly includes a housing fixed to the seat bottom, a recliner rod attached to the seatback and supported for sliding movement relative to the housing, a latching mechanism for releasably latching the recliner rod to the housing, a recline actuator mechanism for controlling actuation of the latching mechanism, a memory mechanism for causing the latching mechanism to automatically relatch the seatback in the reclined position it had prior to forward dumping thereof, and a dump actuator mechanism for controlling actuation of the memory mechanism. The latching mechanism is normally operable in a latched mode for securing the recliner rod in a fixed position relative to the housing, thereby retaining the seatback in a selected reclined position. The latching mechanism is also operable in an unlatched mode wherein the recliner rod is free to move linearly relative to the housing. The recline actuator mechanism is operable for permitting a seat occupant to selectively shift the latching mechanism from its latched mode into its unlatched mode when it is desired to adjust the reclined position of the seatback. The memory mechanism is normally operable in a non-actuated mode for permitting independent actuation of the latching mechanism. However, when it is desired to move the seatback to its forward dumped position, the dump actuator mechanism is selectively actuated for automatically shifting the latching mechanism into its unlatched mode in response to the memory mechanism being shifted into an actuated mode. Moreover, the memory mechanism is operably interconnected to the latching mechanism so as to maintain the latching mechanism in its unlatched mode during forward dumping of the seatback and thereafter until the seatback is returned to its previous reclined position. When the seatback is returned to its previous reclined position, the memory mechanism is automatically returned to its non-actuated mode which, in turn, returns the latching mechanism to its latched mode.

As a further convenience feature, the memory mechanism can also include a seatback stop arrangement for preventing rearward reclining movement of the seatback upon actuation of the dump actuator mechanism. Thus, a person actuating the dump actuator mechanism does not have to restrain the seatback against undesired reclining movement and, as such, is afforded greater convenience in using the dump feature.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings wherein:

FIG. 2 is an enlarged side view of the linear recliner assembly shown in FIG. 1;

FIG. 3 is a perspective view of a portion of the linear recliner assembly;

FIG. 5 is a side view of the seat recliner assembly showing its latching mechanism in a latch mode and its memory mechanism in a non-actuated mode;

FIG. 6 is a side view, similar to FIG. 4, showing the latching mechanism in an unlatched mode and the memory mechanism in an actuated mode;

FIG. 7 is a side view of a linear recliner assembly constructed according to an alternative embodiment of the present invention that is shown with its latching mechanism in a latched mode and its memory mechanism in a non-actuated mode;

FIG. 8 is a side view, similar to FIG. 7, showing the latching mechanism in an unlatched mode and the memory mechanism in an actuated mode;

DETAILED DESCRIPTION OF THE PREFERRED EMBODIMENTS

Figure 1:
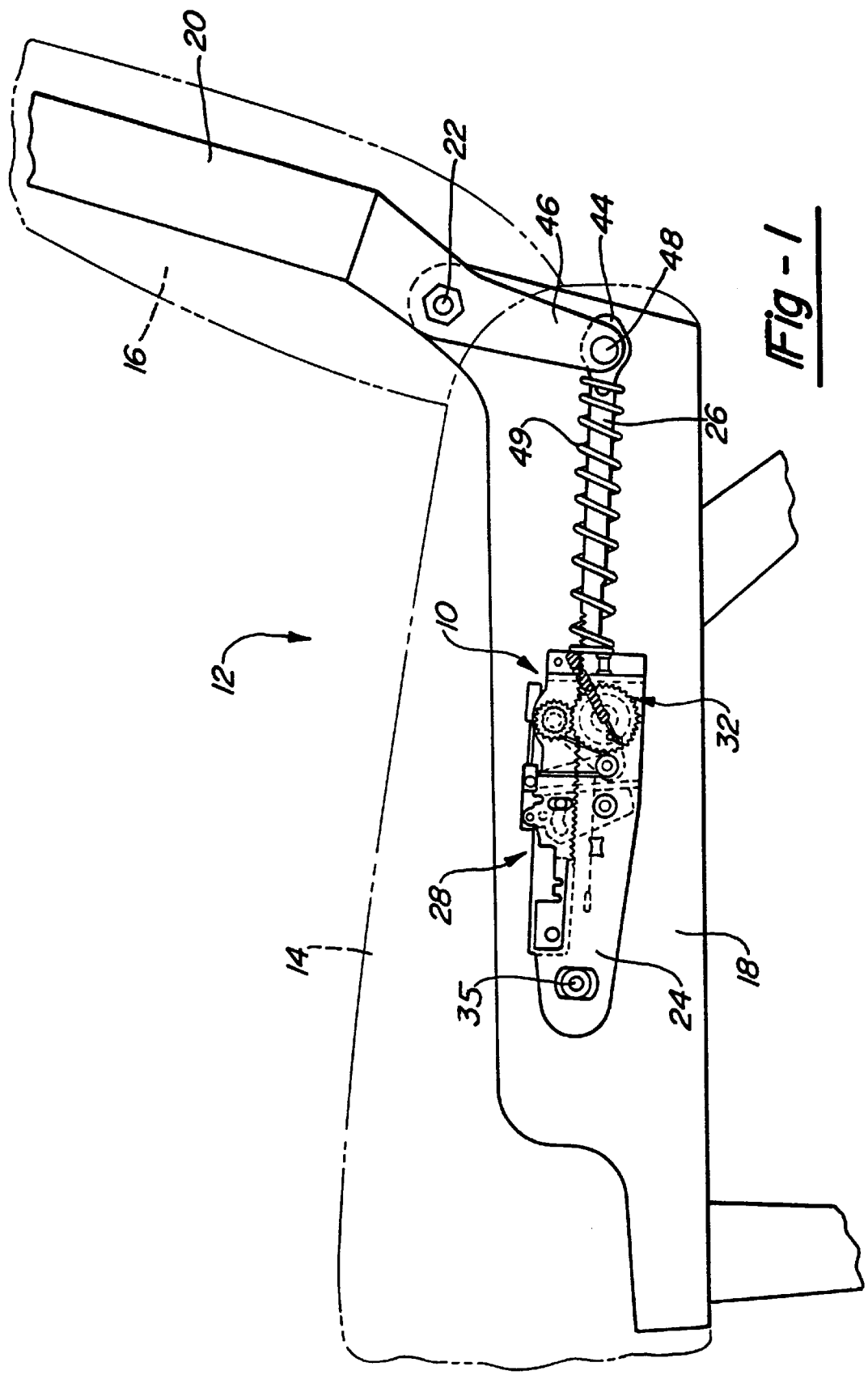
FIG. 1 is a side elevational view of a seat assembly showing the linear recliner assembly of the present invention located along an outer edge of the seat frame.

The present invention relates to a linear recliner assembly 10 shown in FIG. 1 incorporated into a seat assembly 12 having an upholstered seat bottom 14 and an upholstered seatback 16. Seat assembly 12 is of a type contemplated for use as the front seat in a motor vehicle. For example, seat assembly 12 can be of the "all-belts-to-seat" type (i.e., stand-alone structural seats). Seat bottom 14 includes a structural frame, with one of its lateral side rails being identified by reference numeral 18. The structural frame for seatback 16 includes a pair of lateral support arms 20 (one shown), each of which is pivotally attached by a pivot 22 to seat frame 18. As such, seatback 16 is supported for angular movement relative to seat bottom 14. As will be detailed, linear recliner assembly 10 is operable for permitting selective reclining movement of seatback 16 relative to seat bottom 14 between an upright position and a fully-reclined position. Linear recliner assembly 10 is further operable to permit seatback 16 to be pivoted from any reclined position to a forward dumped position to provide greater access to the area located behind seat assembly 12. Upon return of seatback 16 from its forward dumped position, linear recliner assembly 10 is adapted to latch seatback 16 in its previous reclined position.

In general, linear recliner assembly 10 includes a housing 24 fixed to seat frame 18, a recliner rod 26 attached to support arm 20 of seatback 16 and supported for sliding movement relative to housing 24, a latching mechanism 28 for releasably latching recliner rod 26 to housing 24, and a recline actuator mechanism 30 for controlling actuation of latching mechanism 28. Linear recliner assembly 10 also includes a memory mechanism 32 for causing latching mechanism 28 to automatically relatch seatback 16 in the reclined position it had (i.e., its "previous" reclined position) prior to forward dumping thereof, and a dump actuator mechanism 34 for controlling actuation of memory mechanism 32. More particularly, housing 24 is pivotally attached to side rail 18 by a fastener 35 and includes a pair of laterally-spaced housing sections 36a and 36b that are suitably interconnected, such as by clips 38 and fasteners 40. In addition, recliner rod 26 has a first end 42 slidably supported on clips 38 within housing 24 and a second end 44 which is pivotally connected to an end portion 46 of support arm 20 by a hinge pin 48. Finally, a return spring 49 is concentrically mounted on recliner rod 26 between housing 24 and its second end 44 for normally urging seatback 16 to pivot forwardly about pivots 22 to assist in returning seatback 16 from any reclined position to its upright position.

Latching mechanism 28 is supported in housing 24 for selectively allowing linear sliding movement of recliner rod 26 relative to housing 24. In particular, latching mechanism 28 is normally operable in a "latched" mode for securing recliner rod 26 in a fixed position relative to housing 24, thereby preventing movement of support arms 20 about pivots 22 so as to maintain seatback 16 in a selected reclined position. In contrast, latching mechanism 28 is also operable in an "unlatched" mode wherein recliner rod 26 is free to move linearly relative to housing 24. With latching mechanism 28 it is unlatched mode, linear movement of recliner rod 26 in a first (i.e., forward) direction relative to housing 24 results in rearward angular movement of seatback 16 about pivots 22 while linear movement of recliner rod 26 in the opposite (i.e., rearward) direction results in forward angular movement of seatback 16 about pivots 22. Recline actuator mechanism 30 is operable for permitting a seat occupant to selectively shift latching mechanism 28 from its latched mode into its unlatched mode when it is desired to adjust the reclined position of seatback 16. A biasing arrangement is also provided for normally biasing latching mechanism 28 for operation in its latched mode.

According to a preferred construction for linear recliner assembly 10, latching mechanism 28 includes a locking pawl 50 having locking teeth 52 formed thereon. Locking pawl 50 is pivotally attached to housing 24 by a pivot post 54 which is received in a pivot hole 56 formed through locking pawl 50 and pivot holes 58 formed in housing 24. Locking pawl 50 also includes a follower pin 60 that is retained in a guide slot 62 formed in housing 24. Latching mechanism 28 also includes a cam plate 64 that is fixed to an actuator shaft 66. Actuator shaft 66 is supported for rotation relative to housing 24 and includes a portion 68 extending outwardly therefrom. Cam plate 64 includes a cam slot 70 through which follower pin 60 of locking pawl 50 extends. Latching mechanism 28 is actuated by rotating cam plate 64 which, in turn, causes follower pin 60 to move due to the contour of cam slot 70. As such, the contour of cam slot 70 is designed such that rotation of cam plate 64 causes corresponding pivotal movement of locking pawl 50. In particular, FIG. 5 illustrates cam plate 64 rotated to a first position whereat follower pin 60 is positioned in a rearward portion 72 of cam slot 70 and locking pawl 50 is located in a locked position. With locking pawl 50 in its locked position, its locking teeth 52 are meshed with teeth 74 on recliner rod 26, thereby inhibiting linear movement of recliner rod 26 relative to housing 24 and establishing the latched mode of latching mechanism 28. In contrast, FIG. 6 illustrates cam plate 64 rotated to a second position whereat follower pin 60 is positioned in a forward portion 76 of cam slot 70 and locking pawl 50 is located in a released position. With locking pawl 50 in its released position, locking teeth 52 are displaced from meshed engagement with teeth 74 on recliner rod 26, thereby permitting linear movement of recliner rod 26 relative to housing 24 and establishing the unlatched mode of latching mechanism 28.

To rotate cam plate 64 between its first and second positions when it is desired to adjust the reclined position of seatback 16, recline actuator mechanism 30 is shown to include a handle 78 that is fixed to extension 68 of actuator shaft 66. A torsion spring 80 is provided on actuator shaft 66 which acts between cam plate 64 and housing 24 for normally biasing cam plate 64 toward its first position. Thus, the biasing of torsion spring 80 must be overcome before the seat occupant can rotate handle 78 sufficiently to rotate cam plate 64 from its first position to its second position for moving locking pawl 50 out of its locked position and into its released position for intentionally shifting latching mechanism 28 into its unlatched mode. Obviously, handle 78 is located adjacent to seat bottom 14 for the convenience of the seat occupant.

In general terms, memory mechanism 32 is normally operable in a "non-actuated" mode for permitting independent actuation of latching mechanism 28 via operation of handle 78 when adjustment of the reclined position of seatback 16 is desired. However, when it is desired to move seatback 16 to its forward dumped position, dump actuator mechanism 34 is selectively actuated for automatically shifting latching mechanism 28 into its unlatched mode in response to memory mechanism 32 being shifted into an "actuated" mode. Moreover, memory mechanism 32 is operably interconnected to latching mechanism 28 so as to maintain latching mechanism 28 in its unlatched mode during forward dumping of seatback 16 and thereafter until seatback 16 is returned to its previous reclined position. When seatback 16 is returned to its previous reclined position, memory mechanism 32 is automatically returned to its non-actuated mode which, in turn, returns latching mechanism 28 to its latched mode.

According to the preferred construction for linear recliner assembly 10, memory mechanism 32 includes an L-shaped release plate 82 which is supported on a shaft 84, the opposite ends of which are mounted in housing 24. Release plate 82 has a first leg segment 86 and a second leg segment 88 on which a raised stop surface 90 is formed. An actuator link 92 is provided for coupling cam plate 64 to first leg segment 86 of release plate 82. In addition, actuator link 92 is connected to dump actuator mechanism 34 for causing movement of cam plate 64 from its first position to its second position in response to movement of release plate 82 from a lock-out position (FIG. 5) to a cammed position (FIG. 6). More specifically, actuator link 92 includes a first side segment 94 having an elongated guide slot 96 through which a drive pin 98 extends that is mounted to cam plate 64. Actuator link 92 further includes a second side segment 100 that is connected to first leg segment 86 of release plate 82 via a hinge pin 102, and a cross segment 104 interconnecting first and second side segments 94 and 100 thereof.

Memory mechanism 32 is further shown to include an indexing assembly comprised of a cam gear 106, a pivot link 108, and an index gear 110. Cam gear 106 is rotatably supported on a shaft 112, the opposite ends of which are mounted in housing 24. Cam gear 106 includes a gear segment 116 having external gear teeth 118 formed thereon, and a raised cam segment 120 having a circular outer cam surface 122 and a locking detent 124. Pivot link 108 is supported on shaft 84 adjacent to release plate 82 for pivotal movement relative thereto. Pivot link 108 is normally biased away from first leg segment 86 of release plate 82 by a torsion spring 126. Torsion spring 126 is mounted on shaft 84 and has a first spring end 128 engaging a post 130 extending from first leg segment 86 of release plate 82 and a second spring end 132 engaging a post 134 extending from pivot link 108. Post 134 is shown in FIG. 3 to extend through a slot 136 formed in housing 24. Finally, index gear 110 is rotatably mounted on a shaft 138 mounted to pivot link 108. Index gear 110 includes a first gear segment 140 having external gear teeth 142 formed thereon and a second gear segment 144 having gear teeth 146 formed thereon. Index gear 110 is oriented relative to recliner rod 26 and cam gear 106 such that gear teeth 142 on first gear segment 140 are aligned with teeth 74 on recliner rod 26 and gear teeth 146 on second gear segment 144 are aligned with gear teeth 118 on cam gear 106.

Operation of memory mechanism 32 will be described. Referring specifically to FIG. 5, release plate 82 is shown in its lock-out position with its second leg segment 88 retained within locking detent 124 in cam segment 120 of cam gear 106. A biasing spring 148 is connected between a post 150 on housing 24 and a post 152 extending from second leg segment 88 of release plate 82 and through a slot 158 in housing 24 for a biasing surface 154 of second leg segment 88 against a surface 156 in locking detent 124. With release plate 82 located in its lock-out position, torsion spring 126 biases pivot link 108 against raised stop surface 90 on release plate 82 to define its disengaged position whereat gear teeth 142 on first gear segment 140 of index gear 110 are displaced from teeth 74 on recliner rod 26 and gear teeth 146 on second gear segment 144 are displaced from gear teeth 118 on cam gear 106. Additionally, actuator link 92, due to its connection to release plate 82 via hinge pin 102, is biased in a forward direction to the first or recline position shown and cam plate 64 is shown biased by torsion spring 80 to its first position. With actuator link 92 in the recline position shown, guide slot 96 permits sliding movement of drive pin 98 therein in response to movement of cam plate 64 between its first and second position when recline actuator mechanism 30 is selectively actuated to adjust the reclined position of seatback 16. Thus, FIG. 5 illustrates the operative position of the various components associated with linear recliner assembly 10 when memory mechanism 32 is operating in its non-actuated mode.

When it is desired to move seatback 16 from any reclined position to its forwardly dumped position, dump actuator mechanism 34 is actuated for moving actuator link 92 in a rearward direction to the second or dump position shown in FIG. 6. Such movement of actuator link 92 causes release plate 82 to be forcibly pivoted, in opposition to the biasing of torsion spring 126, to its cammed position. With release plate 82 in its cammed position, its second leg segment 88 is released from locking detent 124 and torsion spring 126 causes pivot link 108 to pivot to its engaged position whereat gear teeth 142 on first gear segment 140 of index gear 110 are meshed with teeth 74 on recliner rod 26 and gear teeth 146 on second gear segment 144 of index gear 110 are meshed with gear teeth 118 on cam gear 106. Such meshing of gear teeth 142 on first gear segment 140 of index gear 110 with teeth 74 on recliner rod 26 acts to identify the current position of recliner rod 26 relative to housing 24 and thus the current reclined position of seatback 16. Additionally, such rearward movement of actuator link 92 to its dump position causes the front end of guide slot 96 to engage drive pin 98 which, in turn, causes cam plate 64 to be pivoted, in opposition to torsion spring 80, to its second position for automatically shifting latching mechanism 28 into its unlatched mode. Since latching mechanism 28 is in its unlatched mode, initial forward angular movement of seatback 16 about pivots 22 toward its dumped position causes recliner rod 26 to move linearly in a rearward direction. This rearward linear movement of recliner rod 26 causes index gear 110 to rotate in a first direction (i.e., counterclockwise) which, in turn, causes cam gear 106 to rotate in a first direction (i.e., clockwise). Such rotation of cam gear 106 causes surface 154 of second leg segment 88 to bear against cam surface 122 of cam segment 120, whereby release plate 82 is held in its cammed position during forward dumping of seatback 16. As such, when release plate 82 is in its cammed position, actuator link 92 is held in its dump position which holds cam plate 64 in its second position and locking pawl 50 in its released position. Thus, FIG. 6 illustrates the operative position of the various components associated with linear release assembly 10 when memory mechanism 32 is in its actuated mode.

When it is desired to return seatback 16 from its forward dumped position, seatback 16 is pivoted rearwardly about pivots 22 which causes recliner rod 26 to move linearly in a forward direction. This forward linear movement of recliner rod 26 causes index gear 110 to rotate in a second direction (i.e., clockwise) which, in turn, causes cam gear 106 to rotate in a second direction (i.e., counterclockwise). Such rotation of cam gear 106 causes surface 154 of second leg segment 88 to continue to bear against cam surface 122 until seatback 16 is located in its previous reclined position. At this seatback position, second leg segment 88 of release plate 82 is disengaged from cam surface 122 and torsion spring 126 is permitted to forcibly pivot release plate 82 from its cammed position of FIG. 6 to its lock-out position of FIG. 5, whereby second end segment 88 is again retained within locking detent 124. Such movement of release plate 82 shifts memory mechanism into its non-actuated mode and causes forward sliding motion of actuator link 92 to its recline position. As will be appreciated, such forward sliding movement of actuator link 92 permits cam plate 64 to move from its second position to its first position due to the biasing of torsion spring 80, thereby moving locking pawl 50 from its released position to its locked position for shifting latching mechanism 28 into its latched mode.

The number of teeth associated with each gear segment of index gear 110 and cam gear 106 are selected to provide a predetermined gear reduction such that, during full forward dumping of seatback 16, surface 154 of second leg segment 88 maintains engagement with cam surface 122 in response to rotation of cam gear 106 in its first direction without re-entering locking detent 124. Thus, cam surface 122 of cam gear 106 insures that locking pawl 50 of latching mechanism 28 remains in its released position until seatback 16 is returned to its previously selected reclined position. This is because index gear 110, when rotatably driven by teeth 74 of recliner rod 26, is operable to rotatably index cam gear 106 a certain angular amount in order to dump seatback 16 forward. Cam gear 106 must be rotatably indexed in the opposite direction precisely the same angular amount in order for second leg segment 88 of release plate 82 to engage locking detent 124 of cam gear 106 and allow release arm 82 and cam plate 64 to be returned to the positions shown in FIG. 5. In addition, the resilient connection provided by torsion spring 126 between pivot link 108 and release plate 82 results in pivot link 108 being located in its engaged position prior to movement of locking pawl 50 to its released position. As such, index gear 110 is meshed with teeth 74 on recliner rod 26 prior to linear movement thereof.

To provide means for moving release plate 82 from its lock-out position to its cammed position, dump actuator mechanism 34 is shown to include a cable assembly 160 interconnecting actuator link 92 to a dump operator, schematically shown by block 162. Cable assembly 160 includes an inner cable 164 having a first end connected to cross segment 104 of actuator link 92, and a second end coupled to dump operator 162. Dump operator 162 can be any pull-type or pivoting handle or other equivalent device mounted to seat assembly 12 in a convenient location for actuation by the vehicle occupants.

Figure 9:
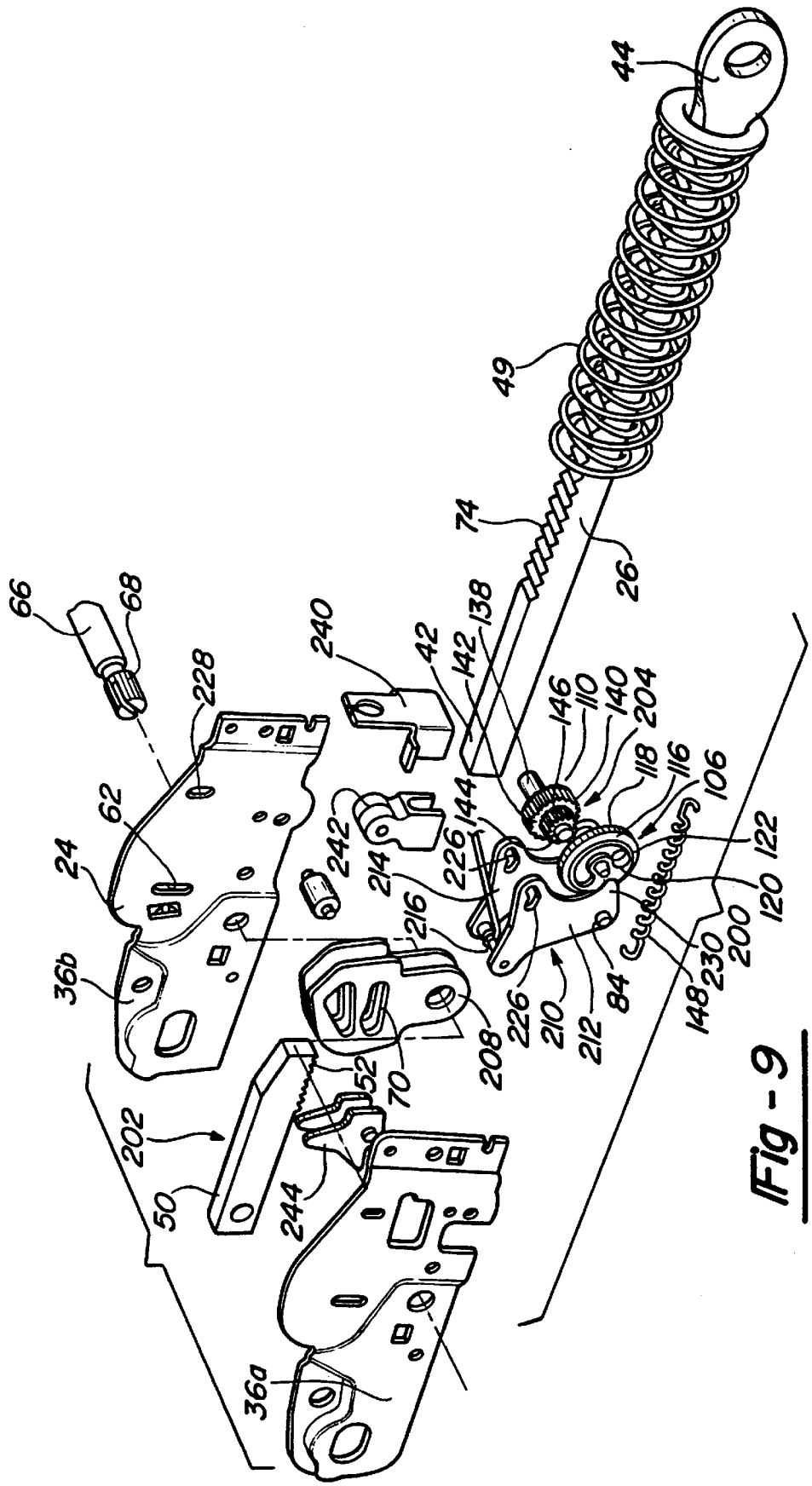
FIG. 9 is a partial exploded perspective view of the linear recliner assembly shown in FIGS. 7 and 8.

With particular reference now to FIGS. 7 through 9, a modified version of linear recliner assembly 10 is shown and identified by reference numeral 200. In general, linear recliner assembly 200 can be incorporated into seat assembly 12 of FIG. 1 in substitution for linear recliner assembly 10 to provide each of the various reclining and dumping features previously disclosed. Accordingly, like reference numerals are used hereinafter to identify those components of linear recliner assembly 200 that are similar in construction and/or function to corresponding components of linear recliner assembly 10.

In general, linear recliner assembly 200 includes a latching mechanism 202 for releasably latching recliner rod 26 to housing 24, recliner actuator mechanism 30 for controlling selective actuation of latching mechanism 202, a memory mechanism 204 for causing latching mechanism 202 to automatically relatch seatback 16 in the reclined position it had (i.e., its "previous" reclined position) prior to forward dumping thereof, and dump actuator mechanism 34 for controlling selective actuation of memory mechanism 204.

Latching mechanism 202 is operable for selectively allowing linear sliding movement of recliner rod 26 relative to housing 24. In particular, latching mechanism 202 is normally operable in a "latched" mode for securing recliner rod 26 in a fixed position relative to housing 24, thereby maintaining seatback 16 in a selected reclined position. Latching mechanism 202 is also operable in an "unlatched" mode wherein recliner rod 26 is free to move linearly relative to housing 24. With latching mechanism 202 in its unlatched mode, linear movement of recliner rod 26 in a first (i.e., forward) direction relative to housing 24 results in rearward angular movement of seatback 16 relative to seat bottom 14 while linear movement of recliner rod 26 in a second (i.e., rearward) direction results in forward angular movement of seatback 16. In a manner similar to that previously described, recline actuator mechanism 30 is operable for permitting a seat occupant to selectively shift latching mechanism 202 from its latched mode into its unlatched mode when it is desired to adjust the reclined position of seatback 16.

According to a preferred construction for linear recliner assembly 200, latching mechanism 202 includes locking pawl 50 which has one end pivotably supported from housing 24 on pivot post 54 and which has locking teeth 52 formed at its opposite end. Follower pin 60 extends outwardly from locking pawl 50 and is retained in a pair of aligned guide slots 62 formed in opposite lateral sides of housing 24. Latching mechanism 202 also includes at least one and, preferably, a pair of laterally-spaced cam plates 208 that are fixed to actuator shaft 66 for concurrent rotation therewith. Actuator shaft 66 is supported for rotation relative to housing 24 and includes portion 68 extending outwardly therefrom to which handle 78 (FIG. 3) is secured. Each cam plate 208 includes cam slot 70 through which follower pin 60 of locking pawl 50 also extends. In operation, latching mechanism 202 is shifted from its latched mode into its unlatched mode by the seat occupant selectively rotating handle 78. Such action causes concurrent rotation of actuator shaft 66 and cam plates 208 which, in turn, causes follower pin 60 to move due to the contour of cam slots 70. The contour of the aligned pair of cam slots 70 is designed such that rotation of cam plates 208 causes corresponding pivotal movement of locking pawl 50. In particular, FIG. 7 illustrates cam plates 208 rotated to a first position whereat follower pin 60 is positioned in rearward portion 72 of each cam slot 70 and locking pawl 50 is located in a locked position. With locking pawl 50 in its locked position, its locking teeth 52 are meshed with teeth 74 on recliner rod 26 for inhibiting linear movement of recliner rod 26 relative to housing 24, thereby establishing the latched mode of latching mechanism 202. In contrast, FIG. 8 shows cam plates 208 rotated to a second position whereat follower pin 60 is positioned in forward portion 76 of each cam slot 70 and locking pawl 50 is located in a released position. With locking pawl 50 in its released position, locking teeth 52 are displaced from meshed engagement with teeth 74 on recliner rod 26 for permitting linear movement of recliner rod 26 relative to housing 24, thereby establishing the unlatched mode of latching mechanism 202.

Figure 4:
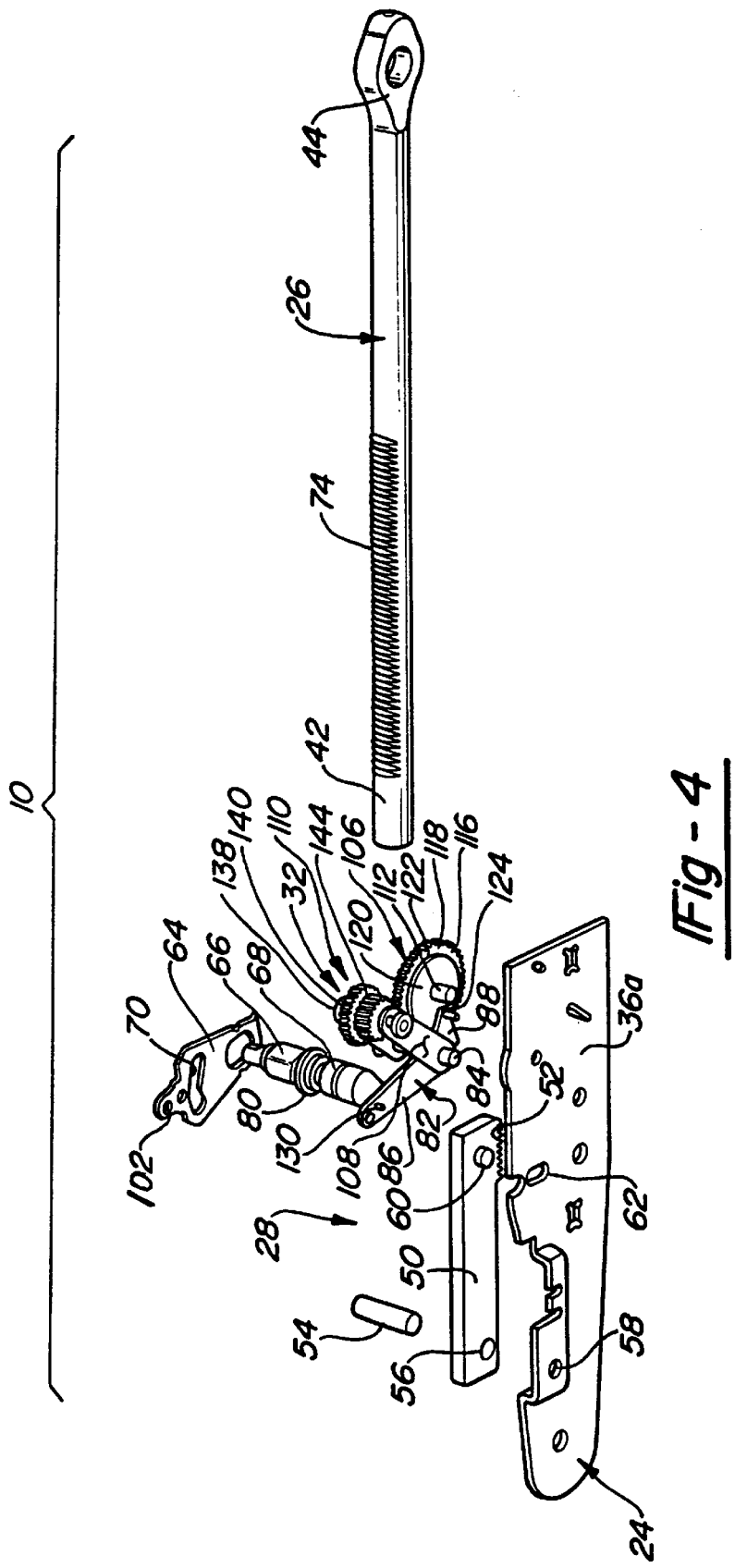
FIG. 4 is a partial exploded perspective view of the linear recliner assembly.

When it is desired to adjust the reclined position of seatback 16, handle 78 is selectively rotated for moving cam plates 208 from their first position to their second position. With cam plates 208 held in their second position, seatback 16 can be moved to any reclined position available between its fully-upright and fully-reclined positions. Upon release of handle 78, a biasing arrangement causes cam plates 208 to be automatically rotated to their first position for moving locking pawl 50 to its locked position, thereby latching seatback 16 in the desired reclined position. The biasing arrangement is similar to that shown in FIG. 4 for recline actuator mechanism 30 and includes a torsion spring 80 which acts between housing 24 and actuator shaft 66 or one of cam plates 208 for normally biasing cam plates 208 toward their first position. Thus, the biasing of torsion spring 80 must be overcome before the seat occupant can rotate handle 78 sufficiently to rotate cam plates 208 from their first position to their second position for moving locking pawl 50 out of its locked position and into its released position when it is desired to intentionally shift latching mechanism 202 from its latched mode into its unlatched mode.

In general terms, memory mechanism 204 is normally operable in a non-actuated mode (FIG. 7) for permitting independent actuation of latching mechanism 202 via operation of handle 78 when adjustment of the reclined position of seatback 16 is desired. However, when it is desired to move seatback 16 to its forward dumped position, dump actuator mechanism 34 is selectively actuated for shifting memory mechanism 204 into an actuated mode (FIG. 8) which causes latching mechanism 202 to be automatically shifted into its unlatched mode. With memory mechanism 204 in its actuated mode, seatback 16 can be forwardly tilted from its reclined position to its forward dumped position. Moreover, memory mechanism 204 is operably interconnected to latching mechanism 202 so as to maintain latching mechanism 202 in its unlatched mode during forward dumping of seatback 16 and thereafter until seatback 16 is returned to its previous reclined position. When seatback 16 is returned from its dumped position to its previous reclined position, memory mechanism 204 is automatically shifted into its non-actuated mode which, in turn, shifts latching mechanism 202 into its latched mode for relatching seatback 16 in the previous reclined position.

According to the preferred construction for linear recliner assembly 200, memory mechanism 202 includes a release assembly 210 having a pair of laterally-spaced release plates 212 and 214 which are supported for pivotal movement on shaft 84, the opposite ends of which are mounted in housing 24. Release assembly 210 also includes a drive pin 216 which directly interconnects release plates 212 and 214 together for synchronous pivotal movement about shaft 84. To provide means for interconnecting release assembly 210 to cam plates 208, drive pin 216 is shown to extend through a generally triangular guide slot 220 formed in each cam plate 208. The engagement of drive pin 216 with a first surface 222 on each of the aligned pair of guide slots 220 is such that cam plates 208 may pivot between their first and second positions in response to actuation of recline actuator mechanism 30 without causing corresponding pivotal movement of release assembly 210. Thus, with memory mechanism 204 in its non-actuated mode, latching mechanism 202 can be selectively shifted between its latched and unlatched modes for adjusting the reclined position of seatback 16. However, when memory mechanism 204 is shifted into its actuated mode, the resulting pivotal movement of release assembly 210 causes drive pin 216 to engage a second surface 224 on each of guide slots 220 which, in turn, causes cam plates 208 to be pivoted to their second position, thereby shifting latching mechanism 202 into its unlatched mode. Those skilled in the art will appreciate that, as an alternative, guide slot 220 can be formed in release plates 212 and 214 while drive pin 216 could be secured to cam plates 208 so as to provide the same coordinated movement therebetween.

Memory mechanism 202 is further shown to include an indexing assembly comprised of cam gear 106 and index gear 110. Cam gear 106 is rotatably supported on shaft 112, the opposite ends of which are mounted in housing 24. Cam gear 106 includes gear segment 116 that has external gear teeth 118 formed thereon. Cam gear 106 also includes raised cam segment 120 that has circular outer cam surface 122 and locking detent 124 formed therein. Index gear 110 is rotatably mounted on shaft 138 which extends through a pair of aligned guide slots 226 formed in release plates 212 and 214. The ends of shaft 138 also project into vertical slots 228 formed in housing 24. Moreover, the contour of guide slots 226 is such that index gear 110 moves in a generally linear manner between a disengaged position and an engaged position in response to corresponding pivotal movement of release assembly 210 between a lock-out position and a cammed position. Index gear 110 is a compound gear and includes first gear segment 140 that has external gear teeth 142 formed thereon and second gear segment 144 that has gear teeth 146 formed thereon. Index gear 110 is located between release plate 212 and 214 and is oriented relative to recliner rod 26 and cam gear 106 such that gear teeth 142 on first gear segment 140 are aligned with teeth 74 on recliner rod 26 while gear teeth 146 on second gear segment 144 are aligned with gear teeth 118 on cam gear 106.

Operation of memory mechanism 204 will be described. Referring specifically to FIG. 7, memory mechanism 204 is shown in its non-actuated mode such that release assembly 210 is in its lock-out position whereat a leg segment 230 of release plate 212 is retained within locking detent 124 in cam segment 120 of cam gear 106. Biasing spring 148 is connected between housing 24 and a retainer flange 232 on release plate 214 for biasing surface 234 of leg segment 230 against surface 156 of locking detent 124. As such, release assembly 210 is normally biased toward the lock-out position shown. When release assembly 210 located in its lock-out position, index gear 110 is located in its disengaged position whereat gear teeth 142 on first gear segment 140 of index gear 110 are displaced from teeth 74 on recliner rod 26 and gear teeth 146 on second gear segment 144 are displaced from gear teeth 118 on cam gear 106. Additionally, cam plates 208 are shown biased by torsion spring 80 to their first position. When memory mechanism 204 is in its non-actuated mode with release assembly 210 in the lock-out position shown, first surfaces 222 of guide slots 220 slide relative to drive pin 216 in response to pivotal movement of cam plates 208 between their first and second positions when recline actuator mechanism 30 is selectively actuated to adjust the reclined position of seatback 16.

When it is desired to move seatback 16 from its current reclined position to its forwardly dumped position, dump actuator mechanism 34 is actuated for shifting memory mechanism 204 from its non-actuated mode into its actuated mode. More specifically, actuation of dump actuator mechanism 34 causes drive pin 216 to be moved in a rearward direction. As shown in FIG. 8, such movement of drive pin 216 causes release assembly 210 to be forcibly pivoted, in opposition to the biasing of torsion spring 148, from its lock-out position into its cammed position. When release assembly 210 is in its cammed position, leg segment 230 of release plate 212 is released from locking detent 124 and index gear 110 is located in its engaged position whereat gear teeth 142 on first gear segment 140 of index gear 110 are meshed with teeth 74 on recliner rod 26 and gear teeth 146 on second gear segment 144 of index gear 110 are meshed with gear teeth 118 on cam gear 106. Such meshing of gear teeth 142 on first gear segment 140 of index gear 110 with teeth 74 on recliner rod 26 acts to identify the current position of recliner rod 26 relative to housing 24, thereby also identifying the current reclined position of seatback 16. To ensure that the current position of recliner rod 26 is identified prior to movement thereof, memory mechanism 202 is designed to locate index gear 110 in its engaged position prior to cam plates 208 being completely shifted into their second position. As such, latching mechanism 202 is shifted into its unlatched mode after index gear 110 is in its engaged position.

Upon actuation of dump actuator mechanism 34, the resulting rearward movement of drive pin 216 causes second surface 224 on each guide slot 220 to engage drive pin 216 which, in turn, causes cam plates 208 to be pivoted, in opposition to torsion spring 80, to their second position for automatically shifting latching mechanism 202 into its unlatched mode. Once latching mechanism 202 is in its unlatched mode, initial forward angular movement of seatback 16 toward its dumped position causes recliner rod 26 to move linearly in a rearward direction relative to housing 24. This rearward linear movement of recliner rod 26 causes index gear 110 to rotate in a first direction (i.e., counterclockwise) which, in turn, causes cam gear 106 to rotate in a first direction (i.e., clockwise). Such rotation of cam gear 106 causes surface 234 of leg segment 230 to bear against cam surface 122 of cam segment 120, whereby release assembly 210 is held in its cammed position during forward dumping of seatback 16. As such, when release assembly 210 is held in its cammed position, drive pin 216 holds cam plates 208 in their second position which, in turn, holds locking pawl 50 in its released position. Thus, latching mechanism 202 is shifted and then held in its unlatched mode when memory mechanism 204 is shifted into its actuated mode.

When it is thereafter desired to return seatback 16 from its forward dumped position, seatback 16 is pivoted rearwardly which causes recliner rod 26 to move linearly in a forward direction relative to housing 24. This forward linear movement of recliner rod 26 causes index gear 110 to rotate in a second direction (i.e., clockwise) which, in turn, causes cam gear 106 to rotate in a second direction (i.e., counterclockwise). Such rotation of cam gear 106 causes surface 234 of leg segment 230 to continue to bear against cam surface 122 until seatback 16 is located in its previous reclined position. Once seatback 16 is positioned in its previous reclined position, leg segment 230 of release plate 212 is disengaged from cam surface 122 and torsion spring 126 is permitted to forcibly pivot release assembly 210 from its cammed position to its lock-out position, whereby leg segment 230 is again retained within locking detent 124. Such movement of release assembly 210 shifts memory mechanism 204 into its non-actuated mode and causes forward pivotal movement of drive pin 216. As will be appreciated, such forward pivotal movement of drive pin 216 permits cam plates 208 to move from their second position to their first position due to the biasing of torsion spring 80, thereby moving locking pawl 50 from its released position to its locked position for shifting latching mechanism 202 into its latched mode.

During full forward dumping of seatback 16, surface 234 of leg segment 230 maintains engagement with cam surface 122 in response to rotation of cam gear 106 in its first direction without re-entering locking detent 124. Thus, cam surface 122 of cam gear 106 insures that locking pawl 50 of latching mechanism 202 remains in its released position until seatback 16 is returned to its previously selected reclined position. This is because index gear 110, when rotatably driven by teeth 74 of recliner rod 26, is operable to rotatably index cam gear 106 a certain angular amount in order to dump seatback 16 forward. Cam gear 106 must be rotatably indexed in the opposite direction precisely the same angular amount in order for leg segment 230 of release plate 212 to engage locking detent 124 of cam gear 106 and allow release assembly 210 and cam plates 208 to be returned to the positions shown in FIG. 7. In addition, the shape of release plates 212 and 214 results in index gear 110 being located in its engaged position prior to movement of locking pawl 50 to its released position. As such, index gear 110 is meshed with teeth 74 on recliner rod 26 prior to linear movement thereof.

To provide means for moving release assembly 210 from its lock-out position to its cammed position, dump actuator mechanism 34 is shown to include a cable assembly 160 interconnecting drive pin 216 to a dump operator, schematically shown by block 162. Cable assembly 160 includes an inner cable 164 having a first end connected to drive pin 216 and a second end coupled to dump operator 162. As previously noted, dump operator 162 can be any pull-type or pivoting handle or other equivalent device mounted to seat assembly 12 in a convenient location for actuation by the vehicle occupants. A locator bracket 240 is fixed to housing 24 for mounting a portion of cable assembly 160 thereto. Linear recliner assembly 200 is also shown to include a front guide 242 and a rear guide 244 for providing lateral support to recliner rod 26 within housing 24.

As an additional comfort feature, memory mechanism 204 of linear recliner assembly 200 includes a seatback stop arrangement 246 that functions to prevent rearward reclining movement of seatback 16 upon actuation of dump actuator mechanism 34. Specifically, seatback stop arrangement 246 functions to hold seatback 16 in its reclined position during the time it takes for the seat occupant to start forward dumping of seatback 16 following memory mechanism 204 being shifted into its actuated mode. Seatback stop arrangement 246 includes an arcuate groove 248 formed in cam segment 120 of cam gear 106 and a follower pin 250 fixed to housing 24 that is retained in groove 248. Thus, when memory mechanism 204 is in its actuated mode with release assembly 210 in its cammed position, forward linear movement of recliner rod 26 is prevented by follower pin 250 engaging end surface 252 of groove 248. Specifically, since cam gear 106 is held against rotation relative to housing 24 by pin 250 engaging groove surface 252 and index gear 110 is meshed with both cam gear 106 and recliner rod 26 when release assembly 210 is in its cammed position, then recliner rod 26 is thereby prevented from moving in a forward direction. The arc length of groove 248 is selected to permit the amount of rotation of cam gear 106 that is required for rearward movement of recliner rod during forward dumping of seatback 16. As such, seatback stop arrangement 246 does not interfere with forward dumping of seatback 16 nor with the return of seatback 16 to its previous reclined position. Finally, stop arrangement 246 only inhibits rearward movement of seatback 10 when memory mechanism 204 is in its actuated mode and, as such, is effectively disabled when memory mechanism 204 is in its non-actuated mode.

Figure 10:
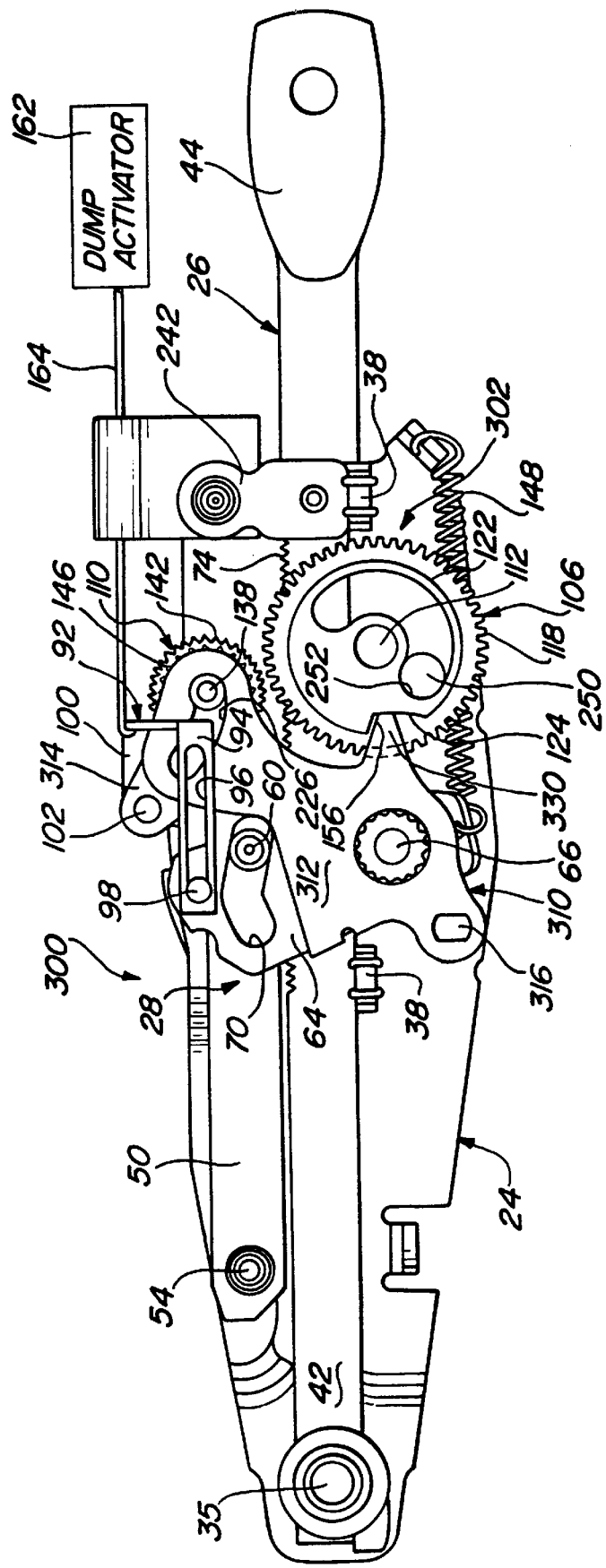
FIG. 10 is a side view of a linear recliner assembly constructed according to yet another alternative embodiment of the present invention.
Figure 11:
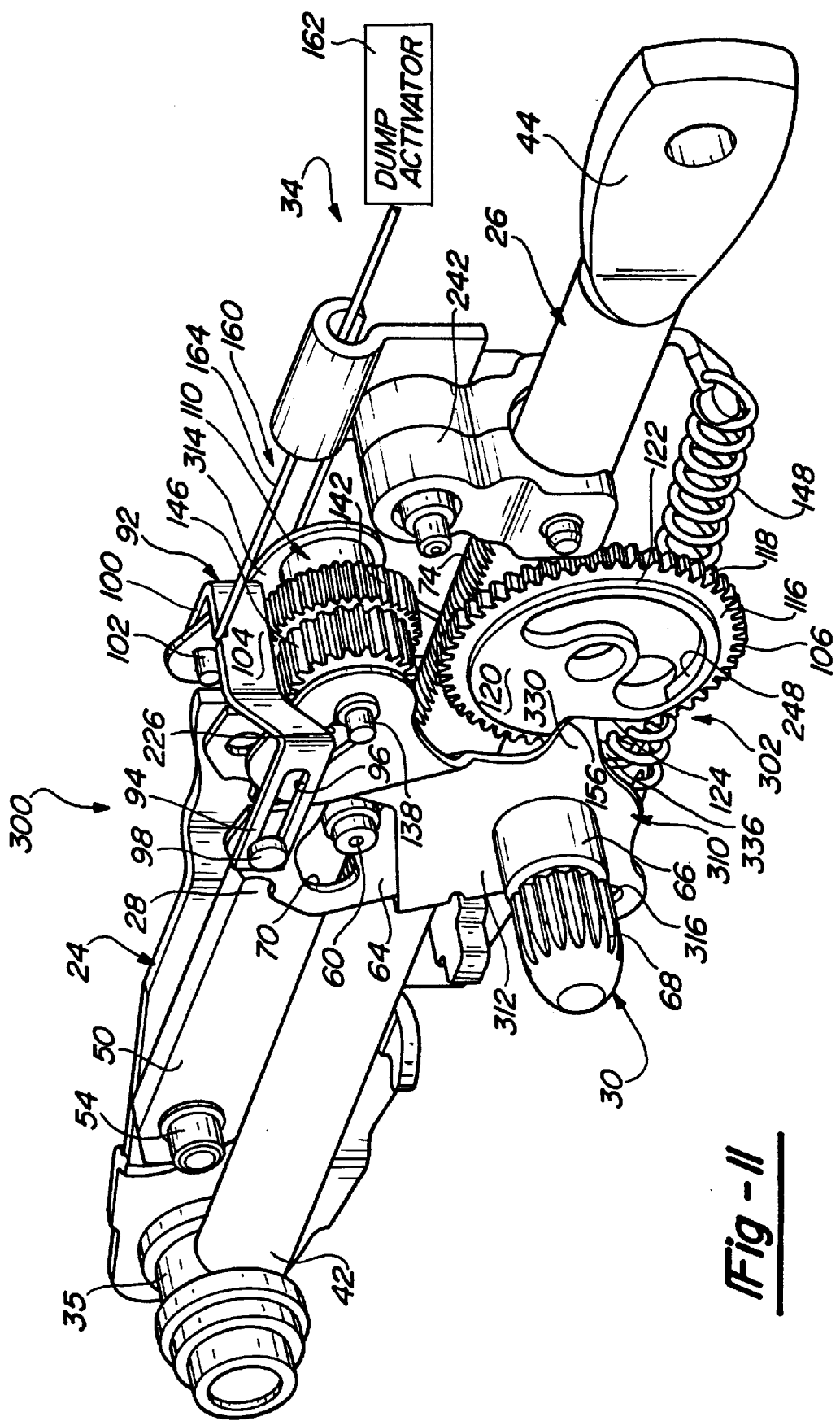
FIG. 11 is a partial perspective view of the linear recliner assembly shown in FIG. 10.

Referring now to FIGS. 10 and 11, another embodiment of the present invention is shown in which the linear recliner assembly is identified by reference numeral 300. In general, linear recliner assembly 300 is designed to perform the same recline and memory dump features as linear recliner assemblies 10 and 200 but is of a modified construction in which a common pivot point is used for its latching mechanism and its memory mechanism. Again, like reference numerals are used hereinafter to identify those components of recliner assembly 300 that are similar in construction and/or function to those of linear recliner assemblies 10 and 200.

In general, linear recliner assembly 300 includes latching mechanism 28 for releasably latching recliner rod 26 to housing 24, recliner actuator mechanism 30 for controlling selective actuation of latching mechanism 28, a memory mechanism 302 for causing latching mechanism 28 to automatically relatch seatback 16 in the previous reclined position it occupied prior to forward dumping thereof, and dump actuator mechanism 34 for controlling selective actuation of memory mechanism 302. Latching mechanism 28 is operable in the manner previously disclosed in that it may be selectively shifted from a latched mode into an unlatched mode by the seat occupant pivoting handle 78 for moving cam plate 64 from its first position to its second position which, in turn, causes locking pawl 50 to be pivoted from its locked position into its released position. In the embodiment shown, latching mechanism 28 includes a pair of laterally-spaced cam plates 64 that are both fixed for common rotation with actuator shaft 66. Thus, the primary feature distinguishing linear recliner assembly 300 from the previously disclosed embodiments relates to memory mechanism 302 also being supported for movement on actuator shaft 66 which effectively reduces the number of components associated therewith.

In general terms, memory mechanism 302 is normally operable in a non-actuated mode for permitting independent actuation of latching mechanism 28 via operation of handle 78 when adjustment of the reclined position of seatback 16 is desired. However, when it is desired to move seatback 16 to its forward dumped position, dump actuator mechanism 34 is selectively actuated for shifting memory mechanism 302 into an actuated mode which causes latching mechanism 28 to be automatically shifted into its unlatched mode. With memory mechanism 302 in its actuated mode, seatback 16 can be forwardly tilted from its reclined position to its forward dumped position. Moreover, memory mechanism 302 is operably interconnected to latching mechanism 28 so as to maintain latching mechanism 28 in its unlatched mode during forward dumping of seatback 16 and thereafter until seatback 16 is returned to its previous reclined position. When seatback 16 is returned from its dumped position to its previous reclined position, memory mechanism 302 is automatically shifted into its non-actuated mode which, in turn, shifts latching mechanism 28 into its latched mode for relatching seatback 16 in the previous reclined position.

According to a preferred construction for linear recliner assembly 300, memory mechanism 302 includes a release assembly 310 having a pair of laterally-spaced release plates 312 and 314 which are supported for pivotal movement on actuator shaft 66. Release assembly 310 also includes a fastener 316 which directly interconnects release plates 312 and 314 together for synchronous pivotal movement on actuator shaft 66. According to the embodiment shown, actuator link 92 is used to provide means for interconnecting release assembly 310 to cam plates 64. In an arrangement similar to that shown in FIG. 3, actuator link 92 is again operable to permit cam plates 64 to pivot between their first and second positions in response to independent actuation of recline actuator mechanism 30 without causing corresponding pivotal movement of release assembly 310. Thus, with memory mechanism 302 in its non-actuated mode, latching mechanism 28 can be selectively shifted between its latched and unlatched modes. Moreover, actuator link 92 is connected to dump actuator mechanism 34 for causing movement of release assembly 310 from its lock-out position to its cammed position upon actuation of dump actuator mechanism 34 which causes cam plates 64 to move from their first position to their second position. Accordingly, when memory mechanism 302 is shifted into its actuated mode, the resulting pivotal movement of release assembly 310 causes cam plates 64 to be pivoted to their second position thereby shifting latching mechanism 28 into its unlatched mode. To coordinate this movement, actuator link 92 includes first side segment 94 having elongated guide slot 96 formed therein through which drive pin 98 extends and which is mounted to one of cam plates 64. Actuator link 92 further includes second side segment 100 that is connected to release plate 314 via hinge pin 102. Finally actuator link 92 includes cross segment 104 which interconnects first and second side segments 94 and 100 and to which dump actuator mechanism 34 is operably attached via cable assembly 160.

Memory mechanism 302 is further shown to include an indexing assembly comprised of cam gear 106 and index gear 110. Cam gear 106 is rotatably supported on shaft 112, the opposite ends of which are mounted in housing 24. Index gear 110 is rotatably mounted on shaft 138 extending through a pair of aligned guide slots 326 formed in release plates 312 and 314. The ends of shaft 138 also project into vertical slots 328 formed in housing 24. The contour of guide slots 326 is such that index gear 110 moves in a generally linear manner between a disengaged position and an engaged position in response to corresponding pivotal movement of release assembly 310 between its lock-out position and its cammed position memory mechanism 302 is also shown to include seatback stop arrangement 246.

Memory mechanism 302 is shown in its non-actuated mode such that release assembly 310 is in its lock-out position whereat a leg segment 330 of release plate 312 is retained within locking detent 124 in cam segment 120 of cam gear 106. Biasing spring 148 is connected between housing 24 and release plate 314 for biasing surface 334 of leg segment 330 against surface 156 of locking detent 124. As such, release assembly 310 is normally biased toward the lock-out position shown. When release assembly 310 located in its lock-out position, index gear 110 is located in its disengaged position whereat gear teeth 142 on first gear segment 140 of index gear 110 are displaced from teeth 74 on recliner rod 26 and gear teeth 146 on second gear segment 144 are displaced from gear teeth 118 on cam gear 106. Additionally, cam plates 64 are biased by torsion spring 80 to their first position. Finally, when release assembly 310 is in its lock-out position, actuator link 92 is located in a first or recline-only position. With actuator link 92 in its recline-only position, guide slot 96 permits sliding movement of drive pin 98 therein in response to movement of cam plates 64 between their first and second positions when recline actuator mechanism 30 is selectively actuated to adjust the reclined position of seatback 16.

When it is desired to move seatback 16 from any reclined position to its forwardly dumped position, dump actuator mechanism 34 is actuated for moving actuator link 92 in a rearward direction to a second or dump position. Such movement of actuator link 92 causes release assembly 310 to be forcibly pivoted to its cammed position. With release assembly in its cammed position, leg segment 330 is released from locking detent 124 and index gear 110 is located in its engaged position whereat gear teeth 142 on first gear segment 140 of index gear 110 are meshed with teeth 74 on recliner rod 26 and gear teeth 146 on second gear segment 144 of index gear 110 are meshed with gear teeth 118 on cam gear 106. Such meshing of gear teeth 142 on first gear segment 140 of index gear 110 with teeth 74 on recliner rod 26 acts to identify the current position of recliner rod 26 relative to housing 24, thereby identifying the current reclined position of seatback 16. Additionally, such rearward movement of actuator link 92 to its dump position causes the end of guide slot 96 to engage drive pin 98 which, in turn, causes cam plates 64 to be pivoted, in opposition to torsion spring 80, to their second position for automatically shifting latching mechanism 28 into its unlatched mode. Once latching mechanism 28 is in its unlatched mode, initial forward angular movement of seatback 16 about pivots 22 toward its forward dumped position causes recliner rod 26 to move linearly in a rearward direction. This rearward linear movement of recliner rod 26 causes index gear 110 to rotate in a first direction (i.e., counterclockwise) which, in turn, causes cam gear 106 to rotate in a first direction (i.e., clockwise). Such rotation of cam gear 106 causes surface 336 of leg segment 330 to bear against cam surface 122 of cam segment 120, whereby release assembly 310 is held in its cammed position during forward dumping of seatback 16. As such, when release assembly 310 is in its cammed position, actuator link 92 is also held in its dump position which, in turn, holds cam plates 64 in their second position and locking pawl 50 in its released position.

When it is desired to return seatback 16 from its forward dumped position, seatback 16 is pivoted rearwardly about pivots 22 which causes recliner rod 26 to move linearly in a forward direction. This forward linear movement of recliner rod 26 causes index gear 110 to rotate in a second direction (i.e., clockwise) which, in turn, causes cam gear 106 to rotate in a second direction (i.e., counterclockwise). Such rotation of cam gear 106 causes surface 336 of leg segment 330 to continue to bear against cam surface 122 until seatback 16 is located in its previous reclined position. At this seatback position, leg segment 330 of release plate 312 is disengaged from cam surface 122 and torsion spring 126 is permitted to forcibly pivot release assembly 310 from its cammed position to its lock-out position, whereby leg segment 330 is again retained within locking detent 124. Such movement of release assembly 310 shifts memory mechanism 302 into its non-actuated mode and causes forward sliding motion of actuator link 92 to its recline-only position. As will be appreciated, such forward sliding movement of actuator link 92 permits cam plates 64 to move from their second position to their first position due to the biasing of torsion spring 80, thereby moving locking pawl 50 from its released position to its locked position for shifting latching mechanism 28 into its latched mode.

The foregoing discussion discloses and describes exemplary embodiments of the present invention. One skilled in the art will readily recognize from such discussion,and from the accompanying drawings and claims, that various changes,modifications and variations can be made therein without departing from the true spirit and fair scope of the invention as defined in the following claims.

What is claimed is:

1. A linear recliner assembly for use with a seat assembly having a seatback supported for pivotal movement relative to a seat bottom, comprising:

a housing secured to the seat bottom;

a recliner rod having a first end attached to the seatback and a second end supported for sliding movement relative to said housing and having teeth formed thereon;

a latching mechanism operable in a latched mode for securing said recliner rod in a fixed position relative to said housing for retaining the seatback in a reclined position, said latching mechanism further operable in an unlatched mode for releasing said recliner rod for movement relative to said housing;

a recline actuator mechanism for selectively shifting said latching mechanism from its latched mode into its unlatched mode to permit adjustment of the reclined position of the seatback;

a memory mechanism operable in a non-actuated mode for permitting independent actuation of said latching mechanism, said memory mechanism further operable in an actuated mode for automatically shifting said latching mechanism into its unlatched mode to permit movement of the seatback from its reclined position to a forward dumped position, said memory mechanism including a gear that is disengaged from said teeth of said recliner rod when said memory mechanism is in its non-actuated mode and which is adapted to meshingly engage said teeth on said recliner rod at a position corresponding to the reclined position of the seatback when said memory mechanism is shifted into its actuated mode, wherein said gear is rotatably indexed in a first direction through a certain amount of angular motion in response to movement of said recliner rod in a first direction caused by movement of the seatback from its reclined position to its forward dumped position, and wherein said gear is thereafter rotatably indexed in a second direction through said certain amount of angular motion in response to movement of said recliner rod in a second direction caused by movement of the seatback from its forward dumped position to its reclined position for causing said memory mechanism to be shifted into its non-actuated mode and said latching mechanism into its latched mode for relatching the seatback in its reclined position, said memory mechanism further including a seatback stop arrangement for inhibiting rearward reclining movement of the seatback past its reclined position when said memory mechanism is in its actuated mode; and a dump actuator mechanism for selectively shifting said memory mechanism from said non-actuated mode to said actuated mode.

2. The linear recliner assembly of claim 1 wherein said seatback stop arrangement includes means for preventing rotation of said gear in said second direction when said recliner rod is located in said position corresponding to the reclined position of the seatback.

3. The linear recliner assembly of claim 2 wherein said seatback stop arrangement includes an arcuate slot formed in said gear and a follower pin fixed to said housing which extends into said gear, said follower pin engages an end surface of said arcuate slot to inhibit rotation of said gear in said second direction when said recliner rod is in said position corresponding to the reclined position of the seatback.

4. The linear recliner assembly of claim 1 wherein said gear is an index gear and said memory mechanism further includes a cam gear rotatably supported from said housing, said index gear being disengaged from said cam gear and said teeth on said recliner rod when said memory mechanism is in its non-actuated mode and said index gear moves into meshed engagement with said cam gear and said teeth on said recliner rod at said position corresponding to the reclined position of the seatback when said memory mechanism is shifted into its actuated mode, wherein subsequent movement of the seatback from its reclined position to its forward dumped position causes movement of said recliner rod in said first direction relative to said housing which causes rotation of said index gear in said first direction and rotation of said cam gear in a first direction, and wherein subsequent movement of the seatback from its forward dumped position toward its reclined position causes movement of said recliner rod in said second direction relative to said housing for causing rotation of said index gear in said second direction and rotation of said cam gear in a second direction.

5. The linear recliner assembly of claim 4 wherein said memory mechanism further includes a release plate supported from said housing for movement between a lock-out position whereat a locking segment thereof is retained in a locking detent formed in said cam gear for inhibiting rotation of said cam gear when said memory mechanism is in its non-actuated mode and a cammed position whereat said locking segment is released from said locking detent for permitting rotation of said cam gear when said memory mechanism is in its actuated mode, said index gear is supported on said release plate such that said index gear is disengaged from said cam gear and said teeth on said recliner rod when said release plate is in its lock-out position and said index gear is meshed therewith when said release plate is in its cammed position, and wherein said dump actuator mechanism is coupled to said release plate for moving said release plate from its lock-out position to its cammed position, wherein movement of said release plate from its lock-out position to its cammed position causes said locking segment thereof to move out of engagement with said locking detent in said cam gear and causes said index gear to engage said teeth of said recliner rod at said position corresponding to the reclined position of the seatback, subsequent movement of the seatback from its reclined position to its forward dumped position causes linear movement of said recliner rod in said first direction which causes said index gear to rotate said cam gear in said first direction for moving locking segment of said release plate into engagement with a cam surface on said cam gear for maintaining said release plate in its cammed position, and wherein subsequent movement of the seatback from its dumped position causes linear movement of said recliner rod in said second direction which causes said index gear to rotate said cam gear in said second direction until said recliner rod is located in said position corresponding to the previous reclined position of the seatback whereat said locking segment of said release plate disengages said cam surface of said cam gear and moves into engagement with said locking detent for moving said release plate to its lock-out position thereby latching the seatback in its previous reclined position.

6. The linear recliner assembly of claim 5 wherein said seatback stop arrangement includes an arcuate slot formed in said cam gear and a follower pin fixed to said housing which extends into said arcuate slot, said follower pin is adapted to engage an end of said arcuate slot for inhibiting rotation of said cam gear in said second direction when said release plate is in its cammed position, thereby inhibiting reclining movement of the seatback beyond its reclined position upon actuation of said dump actuator mechanism, and wherein said follower pin slides within said arcuate slot in response to rotation of said cam gear resulting from movement of the seatback between its reclined and forward dumped positions.

7. A linear recliner assembly for use in a seat assembly having a seatback supported for pivotal movement relative to a seat bottom, comprising:

a housing secured to the seat bottom;

a recliner rod having a first end attached to the seatback and a second end supported in said housing, said second end of said recliner rod having teeth formed thereon;

a locking pawl supported from said housing for movement between a locked position inhibiting movement of said recliner rod relative to said housing and a released position permitting movement of said recliner rod, whereby movement of said recliner rod in a first direction corresponds to forward pivotal movement of the seatback toward a forward dumped position and movement of said recliner rod in a second direction corresponds to rearward pivotal movement of the seatback toward a fully-reclined position;

a cam plate supported from said housing for pivotal movement about a first rotary axis between a first position and a second position, said cam plate operably connected to said locking pawl such that movement of said cam plate between its first and second positions causes concurrent movement of said locking pawl between its locked and released positions;

a recliner actuator mechanism for moving said cam plate from its first position to its second position to permit adjustment of the reclined position of the seatback;

a cam gear supported from said housing for rotation about a second rotary axis, said cam gear having a gear segment with gear teeth formed thereon and a cam segment having a cam surface with a locking detent formed therein;

a release plate supported from said housing for pivotal movement about said first rotary axis between a lock-out position whereat a locking segment thereof is retained in said locking detent for preventing rotation of said cam gear and a cammed position whereat said locking segment is released from said locking detent for permitting rotation of said cam gear;

an index gear having gear teeth and which is supported for movement with said release plate such that when said release plate is in its lock-out position said index gar is in a disengaged position whereat said gear teeth on said index gear are displaced from said teeth on said recliner rod and said gear teeth on said gear segment of said cam gear, and when said release plate is in its cammed position said index gear is in an engaged position whereat said gear teeth on said index gear are meshed with said teeth on said recliner rod and said gear teeth on said gear segment of said cam gear;

a link coupling said cam plate to said release plate and which is operable in a first position for locating said release plate in its lock-out position while permitting movement of said cam plate between its first and second positions, said link is further operable in a second position for locating said release plate in its cammed position and said cam plate in its second position; and a dump actuator mechanism for moving said link from its first position to its second position when it is desired to dump the seatback from its reclined position to its forward dumped position, such movement of said link to its second position causes said index gear to be located in its engaged position so as to meshingly engage said teeth on said recliner rod at a position corresponding to the reclined position of the seatback, whereby subsequent forward pivotal movement of the seatback to its forward dumped position causes said recliner rod to move in said first direction which causes said index gear to rotate said cam gear in a first direction, such rotation of said cam gear in said first direction causes said locking segment of said release plate to engage said cam surface of said cam gear and thereby hold said release plate in its cammed position and said link in its second position, and wherein subsequent rearward pivotal movement of the seatback from its forward dumped position causes said recliner rod to move in said second direction which causes said index gear to rotate said cam gear in a second direction until said recliner rod is located in said position corresponding to the previous reclined position of the seatback whereat said locking segment of said release plate disengages said cam surface and engages said locking detent thereof for moving said release plate to its lock-out position and said link to its first position, thereby latching the seatback in its previous reclined position.

8. The linear recliner assembly of claim 7 wherein said index gear includes a first gear segment having gear teeth adapted to engage said teeth on said recliner rod, and said index gear includes a second gear segment having gear teeth adapted to engage said gear teeth on said cam gear.

9. The linear recliner assembly of claim 7 wherein said index gear is mounted on a shaft extending through a guide slot formed in said release plate such that said index gear is located in its disengaged position when said release plate is in its lock-out position, and wherein movement of said release plate to its cammed position causes said index gear to move to its engaged position.

10. The linear recliner assembly of claim 7 further comprising a guide slot in said link and a drive pin fixed to said cam plate which extends into said guide slot, said guide slot is operable for permitting movement of said cam plate between its first and second positions via actuation of said recline actuator mechanism when said link is in its first position, and wherein movement of said link to its second position via actuation of said dump actuator mechanism causes an edge of said guide slot to engage said drive pin for moving said cam plate to its second position.

11. The linear recliner assembly of claim 7 further comprising a seatback stop arrangement for inhibiting movement of said recliner rod in said second direction when the seatback is in its reclined position and said dump actuator mechanism is actuated for moving said link from its first position to its second position.

12. The linear recliner assembly of claim 11 wherein said seatback stop arrangement includes an arcuate slot formed in said cam gear and a follower pin fixed to said housing which extends into said arcuate slot, said follower pin is adapted to engage a first end of said arcuate slot when the seatback is in its reclined position and said link is in its second position, thereby inhibiting rotation of said cam gear in said second direction which inhibits movement of said recliner rod in said second direction due to said index gear being meshed with said recliner rod and said cam gear.

13. A linear recliner assembly for use with a seat assembly having a seatback supported for pivotal movement relative to a seat bottom, comprising:

a housing secured to the seat bottom;

a recliner rod having a first end attached to the seatback and a second end supported for sliding movement relative to said housing and having teeth formed thereon;

a latching mechanism operable in a latched mode for securing said recliner rod in a fixed position relative to said housing for retaining the seatback in a reclined position, said latching mechanism is further operable in an unlatched mode for releasing said recliner rod for sliding movement relative to said housing, said latching mechanism including a latch member supported from said housing for movement between a first position when said latching mechanism is in its latched mode and a second position when said latching mechanism is in its unlatched mode;

a recline actuator mechanism for selectively moving said latch member from its first position to its second position for shifting said latching mechanism from its latched mode into its unlatched mode to permit adjustment of the reclined position of the seatback;

a memory mechanism that is operable in a non-actuated mode for permitting independent actuation of said latching mechanism, said memory mechanism is further operable in an actuated mode for automatically shifting said latching mechanism from its latched mode into its unlatched mode to permit movement of the seatback from its reclined position to a forward dumped position, said memory mechanism including a release member supported from said housing for movement between a lock-out position when said memory mechanism is in its non-actuated mode and a cammed position when said memory mechanism is in its actuated mode, said release member is operably coupled to said latch member such that movement of said release member from its lock-out position to its cammed position causes movement of said latch member from its first position to its second position, said memory mechanism further includes an index gear supported on said release member such that said index gear is disengaged from said teeth of said recliner rod when said release member is in its lock-out position and said index gear is in meshed engagement with said teeth on said recliner rod when said release member is in its cammed position; and a dump actuator mechanism for selectively moving said release member from its lock-out position to its cammed position for shifting said memory mechanism from its non-actuated mode into its actuated mode to permit the seatback to be moved from its reclined position to its forward dumped position, such movement of said release member to its cammed position causes said index gear to engage said teeth on said recliner rod at a position corresponding to the reclined position of the seatback, whereby said index gear is thereafter rotatably indexed in a first direction through a certain amount of angular motion in response to movement of said recliner rod upon movement of the seatback from its reclined position to its forward dumped position while said release member is held in its cammed position, and wherein said index gear is rotatably indexed in a second direction through said certain amount of angular motion in response to movement of said recliner rod due to subsequent movement of the seatback from its forward dumped position to its reclined position for causing said release plate to move from its cammed position into its lock-out position and said latch member from its second position into its first position for shifting said memory mechanism into its non-actuated mode and relatching the seatback in its reclined position.

14. The linear recliner assembly of claim 13 wherein said memory mechanism further includes a seatback stop arrangement for preventing rotation of said index gear in said second direction when said recliner rod is located in said position corresponding to the reclined position of the seatback and said release member is in its cammed position.

15. The linear recliner assembly of claim 13 wherein said latch member includes a cam slot and said release member includes a drive pin extending into said cam slot, and said cam slot is configured such that said latch member can move between its first and second positions when said release member is in its lock-out position and said latch member is moved to its second position in response to movement of said release plate to its cammed position.

16. The linear recliner assembly of claim 15 wherein said cam slot has a first surface which permits said latch member to move between its first and second positions without acting on said drive pin in a manner that causes said release member to move from its lock-out position, and said cam slot has a second surface which said drive pin engages upon movement of said release member from its lock-out position to its cammed position for causing concurrent movement of said latch member from its first position to its second position.

17. The linear recliner assembly of claim 13 wherein said release member and said latch member are both supported for pivotal movement between their respective positions about a common rotary axis.

18. A linear recliner assembly for use in a seat assembly having a seatback supported for pivotal movement relative to a seat bottom, comprising:
a housing secured to the seat bottom;
a recliner rod having a first end attached to the seatback and a second end supported in said housing, said second end of said recliner rod having teeth formed thereon;
a locking pawl supported from said housing for movement between a locked position inhibiting movement of said recliner rod relative to said housing and a released position permitting movement of said recliner rod, whereby movement of said recliner rod in a first direction corresponds to forward pivotal movement of the seatback toward a forward dumped position and movement of said recliner rod in a second direction corresponds to rearward pivotal movement of the seatback toward a fully-reclined position;
a cam plate supported from said housing for movement between a first position and a second position, said cam plate operably connected to said locking pawl such that movement of said cam plate between its first and second positions causes concurrent movement of said locking pawl between its locked and released positions, and said cam plate having a guide slot formed therein;
a recliner actuator mechanism for moving said cam plate from its first position to its second position to permit adjustment of the reclined position of the seatback;
a cam gear rotatably supported from said housing and having a gear segment with gear teeth formed thereon and a cam segment having a cam surface with a locking detent formed therein;
a release plate supported from said housing for movement between a lock-out position whereat a locking segment thereof is retained in said locking detent for preventing rotation of said cam gear and a cammed position whereat said locking segment is released from said locking detent for permitting rotation of said cam gear, said release plate having a drive pin extending therefrom and which is retained within said guide slot in said cam plate, said guide slot having a first surface which permits movement of said cam plate between its first and second positions when said release plate is in its lock-out position, and said cam slot has a second surface which said drive pin engages upon movement of said release plate from its lock-out position to its cammed position for causing concurrent movement of said latch member from its first position to its second position;
an index gear having gear teeth and which is supported for movement with said release plate such that when said release plate is in its lock-out position said gear teeth on said index gear are displaced from said teeth on said recliner rod and said gear teeth on said gear segment of said cam gear, and when said release plate is in its cammed position said gear teeth on said index gear are meshed with said teeth on said recliner rod and said gear teeth on said cam segment of said cam gear; and
a dump actuator mechanism for moving said release plate from its lock-out position to its cammed position when it is desired to dump the seatback from its reclined position to its forward dumped position, such movement of said release plate to its cammed position causes said index gear to engage said teeth on said recliner rod at a position corresponding to the reclined position of the seatback, whereby subsequent forward pivotal movement of the seatback to its forward dumped position causes said recliner rod to move in said first direction which causes said index gear to rotate said cam gear in a first direction, such rotation of said cam gear in said first direction causes said locking segment of said release plate to engage said cam surface of said cam gear and hold said release plate in its cammed position, and wherein subsequent rearward pivotal movement of the seatback from its forward dumped position causes said recliner rod to move in said second direction which causes said index gear to rotate said cam gear in a second direction until said recliner rod is located in said position corresponding to the previous reclined position of the seatback whereat said locking segment of said release plate disengages said cam surface and engages said locking detent thereof, whereby said release plate moves to its lock-out position thereby latching the seatback in its previous reclined position.

19. The linear recliner assembly of claim 18 wherein said index gear includes a first gear segment having gear teeth adapted to engage said teeth on said recliner rod, and a second gear segment having gear teeth adapted to engage said gear teeth on said cam gear.

20. The linear recliner assembly of claim 18 wherein said index gear is mounted on a shaft extending through a guide slot formed in said release plate such that said index gear is located in a disengaged position for locating said gear teeth of said index gear at a position displaced from said recliner rod teeth and said cam gear teeth when said release plate is in its lock-out position, and wherein movement of said release plate to its cammed position causes said index gear to move to an engaged position whereat its gear teeth are meshed with said recliner rod teeth and said cam gear teeth.

21. The linear recliner assembly of claim 18 further comprising a seatback stop arrangement for inhibiting movement of said recliner rod in said second direction wherein the seatback is in its reclined position and said release plate is moved to its cammed position.

22. The linear recliner assembly of claim 21 wherein said seatback stop arrangement includes an arcuate slot formed in said cam gear and a follower pin fixed to said housing which extends into said arcuate slot, said follower pin is adapted to engage a first end of said arcuate slot when the seatback is in its reclined position and said release plate is in its cammed position thereby inhibiting rotation of said cam gear in said second direction which inhibits movement of said recliner rod in said second direction due to said index gear being meshed with said recliner rod and said cam gear.

\* \* \* \* \*